United States Patent [19]

Tanaka et al.

[11] Patent Number: 5,404,498

[45] Date of Patent: Apr. 4, 1995

[54] VOLTAGE SETTING APPARATUS IN A MULTIPLEX TRANSMISSION SYSTEM

[75] Inventors: Motoharu Tanaka, Yokohama; Kyosuke Hashimoto; Kiyoshi Inoue, both of Hiratuska, all of Japan

[73] Assignee: The Furukawa Electric Co., Ltd., Tokyo, Japan

[21] Appl. No.: 917,059

[22] PCT Filed: Dec. 3, 1991

[86] PCT No.: PCT/JP91/01686

§ 371 Date: Sep. 15, 1992

§ 102(e) Date: Jul. 30, 1992

[87] PCT Pub. No.: WO92/10897

PCT Pub. Date: Jun. 25, 1992

[30] Foreign Application Priority Data

Dec. 4, 1990 [JP] Japan .................................. 2-400406
Jan. 18, 1991 [JP] Japan .................................. 3-018409

[51] Int. Cl.⁶ .................... G06F 11/00; H04L 12/40
[52] U.S. Cl. .................................... 395/575; 370/16; 371/8.2; 371/11.2
[58] Field of Search ............... 371/11.2, 8.2; 370/13, 370/16, 16.1; 395/575

[56] References Cited

U.S. PATENT DOCUMENTS

| | | | |
|---|---|---|---|
| 3,803,355 | 4/1974 | Fiedler | 370/13 |
| 4,819,225 | 4/1989 | Hochstein | 370/16 |
| 5,010,550 | 4/1991 | Hirata | 371/8.2 |
| 5,031,176 | 7/1991 | Mayne | 371/8.2 |
| 5,050,187 | 9/1991 | Ichie | 375/36 |
| 5,079,759 | 1/1992 | Kajiyama | 370/13 |
| 5,111,460 | 5/1992 | Botzenhardt | 371/11.2 X |
| 5,153,874 | 10/1992 | Kohno | 370/13 |

FOREIGN PATENT DOCUMENTS 4-10828 1/1992 Japan .

*Primary Examiner*—Charles E. Atkinson
*Assistant Examiner*—Glenn Snyder
*Attorney, Agent, or Firm*—Frishauf, Holtz, Goodman & Woodward

[57] ABSTRACT

Multiplex nodes (11, 12) connected via multiplex transmission lines (A, B and C), a voltage setting unit 16, which changes the voltage of the multiplex transmission line C to a specified value, a controller IC 14, which detects a failure in the multiplex transmission lines A and B, a protective circuit 15, which writes specified address data received from the controller IC 14 and key word data and sends a state signal corresponding to these pieces of data to the voltage setting unit 16, and a controller IC 14 which writes these pieces of data in a predetermined area of the protective circuit 15 are provided. The controller IC 14 detects a failure, the voltage setting unit 16 connects the specified multiplex transmission line C to a power supply or ground according to a state signal received from the protective circuit 15, thus changing the states of the multiplex transmission lines A and B.

6 Claims, 7 Drawing Sheets

VOLTAGE SETTING APPARATUS IN A MULTIPLEX TRANSMISSION SYSTEM

TECHNICAL FIELD

The present invention relates to a multiplex transmission system for transmitting data among multiplex nodes which are connected to a common multiplex transmission line, and more particularly, to a voltage setting apparatus in the multiplex transmission system for setting the voltage of the multiplex transmission line.

BACKGROUND ART

Typical of this type of multiplex transmission system is a LAN (Local Area Network) transmission system. A typical LAN include CAN (Control Area Network) which is used for data transmission in a car.

In the multiplex transmission system based on the CAN, the transmission waveform for high speed applications (e.g., high-speed transmission at a transmission speed of 1 Mbps) is defined, and two multiplex transmission lines (buses) are used so that data are transmitted in a balanced mode.

Reliability is required of some of the signals handled in an automotive LAN because they may affect people's lives if they should be transmitted erroneously. SAE (Society of Automotive Engineers) has proposed a fault tolerant feature for a power short circuit in one of the aforementioned two buses, an open bus, and disconnection of one side of a terminating circuit connected to both ends of a bus.

As a system which provides such fault tolerant feature, there is, for instance, a multiplex transmission system according to Japanese Patent Application No. H2-113751 (published as Japanese Unexamined Patent Publication No. H4-10828 on Jan. 16, 1992). In this multiplex transmission system, three or more multiplex transmission lines are used and one line thereof is used as a control line. A master node connected to the multiplex transmission lines functions to detect a fault. If such fault is detected, then a controller IC or the like, which performs communication control, controls the voltage of the control line and secures the transmission of signals by the two buses other than the bus which has incurred the fault.

However, this multiplex transmission system presented a problem in that, if a failure such as software fault and hardware malfunction takes place in a controller IC, a controller circuit or the like, which controls the voltage of the control line, then the voltage of the control line becomes unstable. Particularly in the worst case, the voltage of the aforementioned control line almost "oscillates," preventing transmission in some cases.

DISCLOSURE OF THE INVENTION

An object of the present invention is to provide a voltage setting apparatus in a multiplex transmission system which does not affect the voltage of a control line even if a failure occurs in a controller IC, control circuit or the like of a multiplex node which detects a fault.

Another object of the present invention is to provide a voltage setting apparatus which is capable of preventing large current from flowing into a transmission line due to a failure.

A further object of the present invention is to provide a voltage setting apparatus which is designed to control a voltage drop in a resistor in the voltage setting apparatus at the time of transmission to maintain the potential in the control line at a constant level, thereby suppressing radio noises.

Yet another object of the present invention is to provide a voltage setting apparatus which is designed so that the voltage setting apparatus does not malfunction, thereby to prevent a system breakdown, even if a controller IC, control circuit or the like should fail.

To fulfill the above-mentioned objects, in a multiplex transmission system which includes at least two multiplex nodes, which are interconnected via at least three multiplex transmission lines, a voltage setting means, which changes the voltage of one specified multiplex transmission line out of the multiplex transmission lines to a predetermined set value, a detecting means, which detects a failure in the foregoing multiplex transmission lines, and which system is designed so that, if the foregoing failure is detected, the specified multiplex transmission line is connected to the power supply or ground, and the condition of the foregoing multiplex transmission lines is changed to control the multiplex transmission among the multiplex nodes; the voltage setting apparatus in accordance with the present invention is equipped with a voltage setting means which has a current limiting unit which limits currents between the foregoing specified multiplex transmission lines and a power supply and the ground.

As described above, according to the present invention, even if a failure of a multiplex transmission line is detected, the voltage setting measns is not allowed to change the voltage of the specified multiplex transmission line to the predetermined set value, unless a particular procedure is taken which, for example, includes writing of particular data output from the detecting means, supplying a state signal corresponding to the particular data, and writing the particular data in a predetermined area. This enables the voltage setting means to maintain a set voltage without being affected by the aforementioned failure even if the detecting means for detecting faults fails.

BRIEF DESCRIPTION OF THE DRAWINGS

An embodiment of the present invention is illustrated by the drawings in which.

BEST MODE OF CARRYING OUT THE INVENTION

The embodiment of the present invention will now be described with reference to the drawings of FIG. 1 through FIG. 13.

Figure 1:
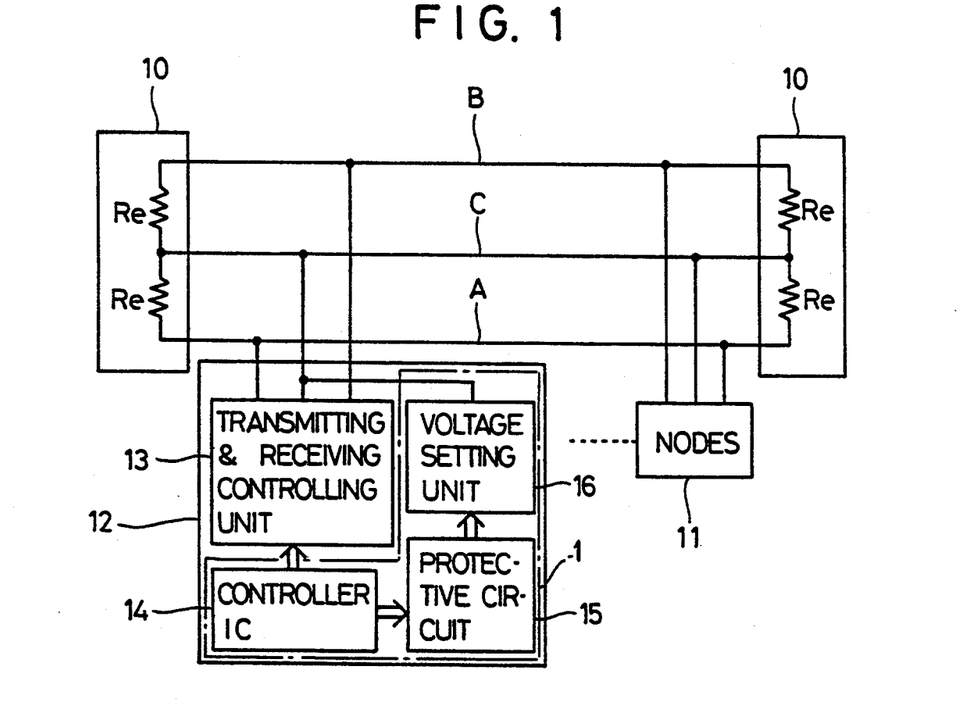
FIG. 1 is a configuration block diagram which shows the configuration of a multiplex transmission system in accordance with the present invention.

Referring to FIG. 1, in the multiplex transmission system in accordance with the present invention, terminal resistors Re - Re, which form a terminating circuits 10, are connected across three multiplex transmission lines A, B and C at both ends, and a plurality of multiplex nodes 11 and a master node 12 are connected to the multiplex transmission lines A through C in parallel. In this multiplex transmission system, the multiplex nodes 11 are equipped with transmitting & receiving control unit, which is not shown and which has a receiving control function for detecting a potential difference between the multiplex transmission lines and a transmitting control function for transmitting signals, and a controller IC which detects a potential difference and controls signal transmission. Therefore, in the multiplex transmission system, if any one of the multiplex transmission lines fails, the multiplex nodes 11 secure signal transmission through the remaining two multiplex transmission lines.

The master node 12 comprises a controller IC 14, a protective circuit 15, and a voltage setting unit 16 in addition to a transmitting & receiving control unit 13 which has the same function as the transmitting & receiving control unit of the multiplex nodes 11. Further, the controller IC 14, the protective circuit 15, and the voltage setting unit 16 comprise the voltage setting apparatus 1 in accordance with the present invention.

The controller IC 14 controls the transmitting & receiving control unit 13 to have it transmit data and it also sends specified address data AD and a write signal WT to the protective circuit 15.

Figure 2:
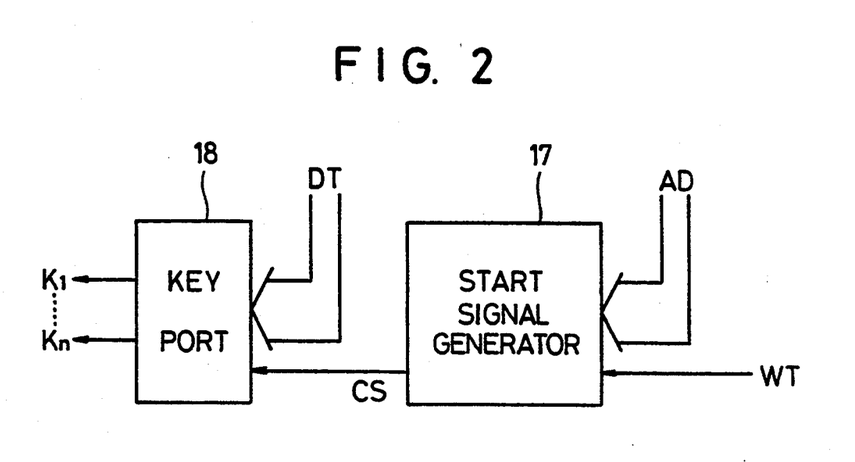
FIG. 2 is a configuration block diagram which shows the first embodiment of the configuration of a protective circuit of the voltage setting apparatus shown in FIG. 1.

Referring to FIG. 2, the protective circuit 15 ia composed of a start signal generator circuit 17 and a key port 18, and it issues a state signal K according to a specified address data AD and a write signal WT entered. More specifically, the start signal generator circuit 17 makes a chip selector CS active when the specified address data AD and the write signal WT received from the controller IC 14 become active. If the key port 18 obtains specified data from the chip selector CS given by the start signal generator circuit 17, and key word data from the data DT, then it makes active the state signal K, which corresponds to the data, and supplies it to the voltage setting unit 16.

The voltage setting unit 16 sets the voltage of the multiplex transmission line C according to the state signal K received through the key port 18.

Figure 3:
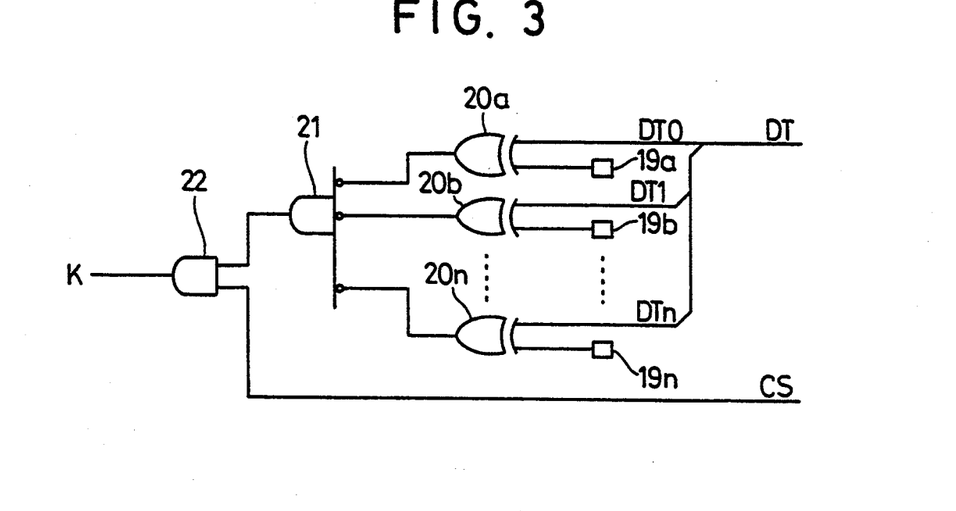
FIG. 3 is a logical circuit diagram which illustrates the configuration of the key port shown in FIG. 2.

FIG. 3 is the logical circuit diagram which illustrates the configuration of the aforementioned key port 18. Referring to the figure, data output units 19a through 19n supply specified data of the bits which correspond to the bits of the data DT entered. The data DT and the specified data are compared by exclusive OR circuits 20a through 20n, then the comparison result is supplied to an AND circuit 21. More specifically, the 0th bit through nth bit of the data DT and specified data of the 0th through nth bits corresponding to the bits are supplied to the exclusive OR circuits 20a through 20n. If both data entered coincide with each other, then all the exclusive OR circuits 20a through 20n output inactive state (low-level state) signals to the AND circuit 21.

When the signals entered are all at the low level, the AND circuit 21 makes an output signal active and supplies it to an AND circuit 22. This AND circuit 22 makes the state signal K active when the output signal from the above-mentioned AND circuit 21 and the chip selector CS are both active. More specifically, at the key port 18, if the chip selector CS is active and the data DT is identical to the specified data set at the data output units 19a through 19n, then the state signal K corresponding to the data DT is made active and this is sent to the voltage setting unit 16.

The aforementioned state signal K may be a single signal or two or more signals.

Accordingly, in this embodiment, the protective circuit 15 is allowed to make the state signal K active and send it to the voltage setting unit 16 only when the controller IC 14 operates normally, making the specified address data AD, the write signal WT, and the data DT active, thus enabling the aforementioned voltage setting unit 16 to set the voltage of the multiplex transmission line C according to the aforementioned state signal K. This makes it possible to prevent the voltage of the control line from being affected even if the controller IC, control circuit or other element falls.

Further, unless the data DT supplied by the controller IC 14 coincides with the specified data issued by the data output units 19a through 19n, the protective circuit 15 sets the state signal K for the normal state (the state signal K is inactive, i.e., at the low level in the figure) after that even if the chip selector CS is in the active state, and it is capable of keeping this state unchanged unless a reset signal is entered. Furthermore, even if a controller IC 14 or the like should malfunction and accidentally issue the key word, the state signal K is made inactive, preventing the voltage of the multiplex transmission line C from becoming unstable due to the malfunction. This makes it possible to maintain the set voltage and prevents a system breakdown.

Figure 4:
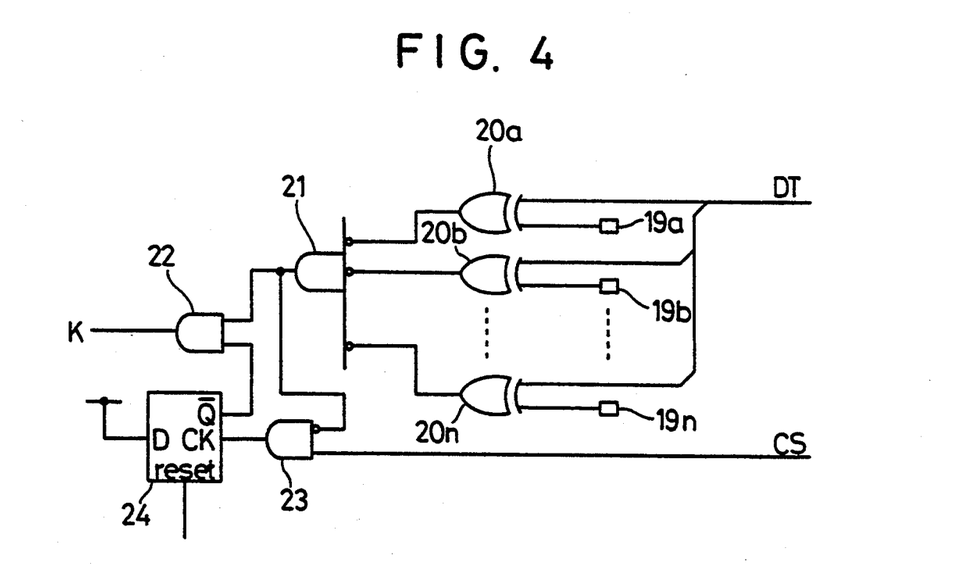
FIG. 4 is a logical circuit diagram which shows the configuration of another embodiment of the key port.

FIG. 4 is another embodiment of the key port. The same components as those shown in FIG. 3 are assigned the same signs for the convenience of explanation.

Referring to FIG. 4, the key port in this embodiment has a D-type flip-flop 24 which has been added to the composition shown in FIG. 3. In this key port, the output signal of an AND circuit 23 is set for the active state unless the chip selector CS is in the active state and the data DT issued by the controller IC 14 is the key word. This causes an output $\overline{Q}$ of the D-type flip-flop 24 to be placed in the low level state, and the state signal K is maintained at the low level after that until the D-type flip-flop 24 is reset.

Figure 5:
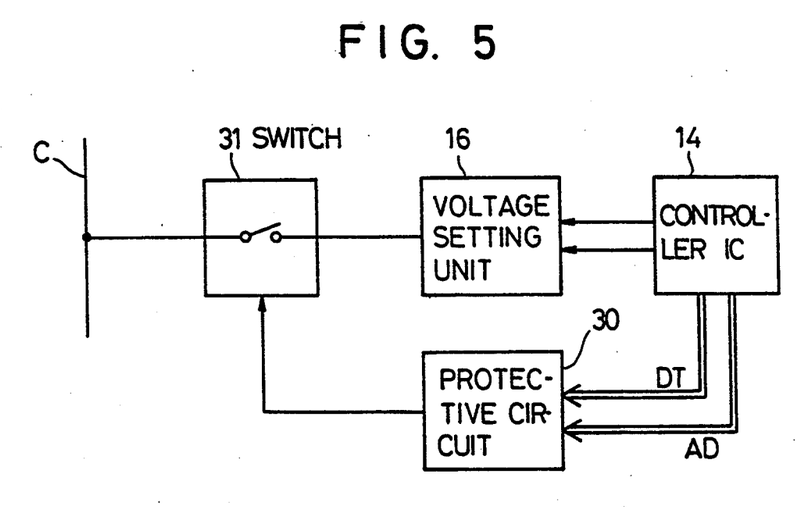
FIG. 5 is a configuration block diagram which illustrates the second embodiment of the configuration of the voltage setting apparatus.

FIG. 5 is the configuration block diagram which shows the second embodiment of the configuration of the voltage setting apparatus. Referring to FIG. 5, the voltage setting apparatus consists of the controller IC 14, the voltage setting unit 16, a protective circuit 30, which has a monitoring function for watchdogging the controller IC 14, and a switch 31.

The controller IC 14 controls the voltage setting unit 16 to change a set voltage and also supplies the address data AD, the write signal WT, and the data DT, which is the key word, to the protective circuit 30.

Figure 6:
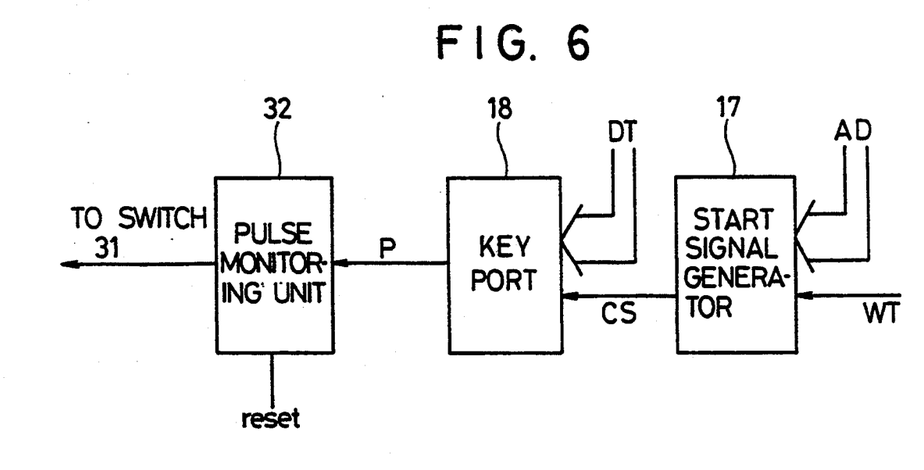
FIG. 6 is a configuration block diagram which illustrates the second embodiment of the configuration of the protective circuit shown in FIG. 5.

Referring to FIG. 6, the protective circuit 30 comprises the start signal generator circuit 17, the key port 18, and the pulse monitoring unit 32.

The start signal generator circuit 17 makes a chip selector CS active when the specified address data AD and the write signal WT received from the controller IC 14 become active. If the key port 18 obtains the specified data from the chip selector CS given by the start signal generator circuit 17, and the data DT, which is a key word, then it makes active the state signal P, which corresponds to the data, and supplies it to the pulse monitoring unit 32. The pulse monitoring unit 32 monitors the state signal P received from the key port 18.

More specifically, the start signal generator circuit 17 makes the chip selector CS active when the address data AD indicates the specified address and the write signal WT becomes active, while the key port 18 generates the state signal P by only one pulse if the chip selector CS is active and the specified data is obtained from the data DT. The pulse monitoring unit 32 turns the switch 31 ON only as long as the above-mentioned pulse entered continues within a predetermined time. If the above-mentioned pulse is not entered within the predetermined time, then the pulse monitoring unit 32 keeps the switch 31 OFF unless the reset signal is received after that.

Figure 7:
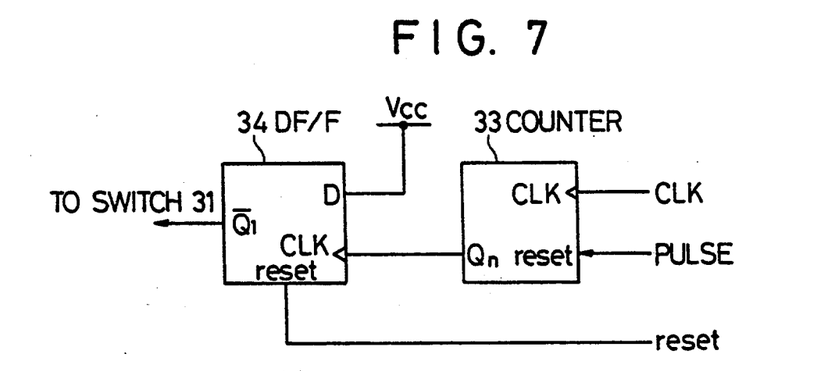
FIG. 7 is a logical circuit diagram which illustrates the first embodiment of the pulse monitoring unit shown in FIG. 6.
Figure 8:
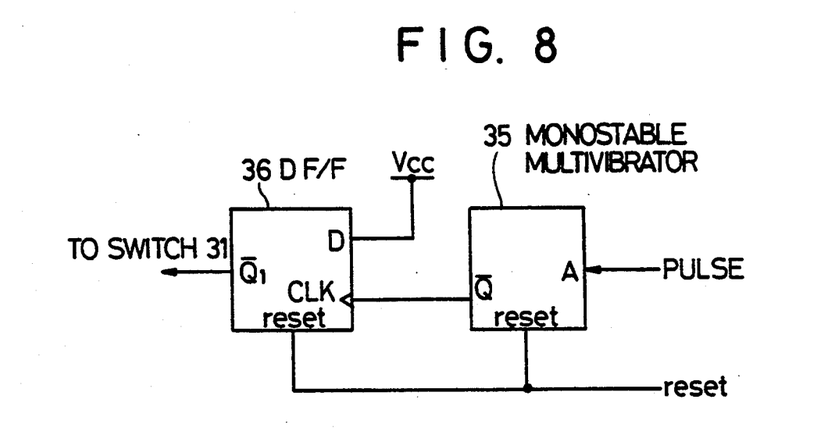
FIG. 8 is a logical circuit diagram which shows the second embodiment of the pulse monitoring unit shown in FIG. 6.

FIG. 7 and FIG. 8 are the logical circuit diagrams which illustrate the first and second embodiments of the pulse monitoring unit 32.

Referring to FIG. 7, the circuit of the pulse monitoring unit 32 is configured so that the pulse (state signal P) received from the key port 18 resets a counter circuit 33. Accordingly, in the pulse monitoring unit 32, if the pulse is not supplied to the counter circuit 33 for longer than the predetermined time, that is, if the circuit is not reset, then addition is continued by a CLK signal in the counter circuit 33 until an output Qn of the nth bit switches to the high level, then the output Qn is supplied to a CLK terminal of a D-type flip-flop 34. The D-type flip-flop 34 detects the moment the signal supplied to the CLK terminal switches from the low level to the high level, then changes a signal $\overline{Q_1}$ sent to the switch 31 from the high level to the low level, thus turning the switch 31 OFF.

Referring to FIG. 8, the circuit of the pulse monitoring unit 32 is configured so that the pulse (state signal P) received from the key port 18 is supplied to a monostable multivibrator 35. Therefore, the monostable multivibrator 35 continues to issue a low-level output $\overline{Q}$ once it receives the aforementioned pulse. When the D-type flip-flop 36 detects an interruption of the aforementioned pulse for longer than the predetermined time and also detects the moment the output $\overline{Q}$ switched from the low level to the high level, it switches the signal $\overline{Q_1}$ supplied to the switch 31 from the high level to the low level, thus turning the switch 31 OFF.

Accordingly, in the voltage setting apparatus of the second embodiment, the controller IC 14 is monitored by monitoring the state signal P, and if the state signal P is not issued within a predetermined time, then it turns the switch 31 is turned OFF and the connection between the voltage setting unit 16 and the multiplex transmission line C is disengaged, making it possible to keep this state unchanged unless the reset signal is supplied to the D-type flip-flops 34 and 36. Owing to this feature, the connection between the voltage setting unit 16 and the multiplex transmission line C is disengaged also if the controller IC 14 malfunctions, accidentally issuing the key word. Thus, the voltage of the multiplex transmission line C can be prevented from becoming unstable due to such malfunction, thereby preventing a system breakdown.

In this invention, in addition to the aforementioned embodiments, it is possible to provide a switch between, for example, the controller IC and the key port, and to design the protective circuit to detect a failure in the voltage setting unit so that it is possible to turn OFF the switch, which connects the controller IC and the key port, to prevent data from being written in the aforementioned key port when the protective circuit detects the aforementioned failure, thus successfully coping with the failure in the voltage setting unit.

Figure 9:
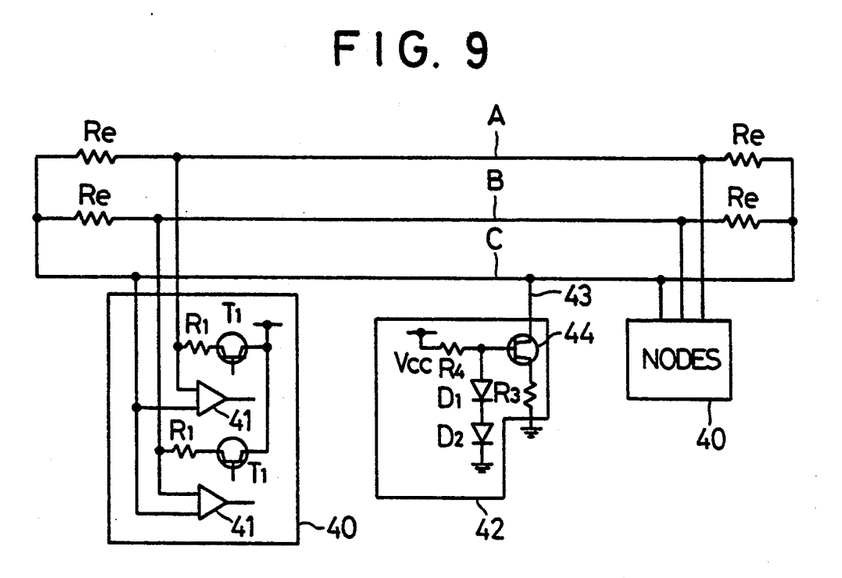
FIG. 9 is a configuration block diagram which shows the second embodiment of the configuration of the multiplex transmission system in accordance with the present invention.
Figure 10:
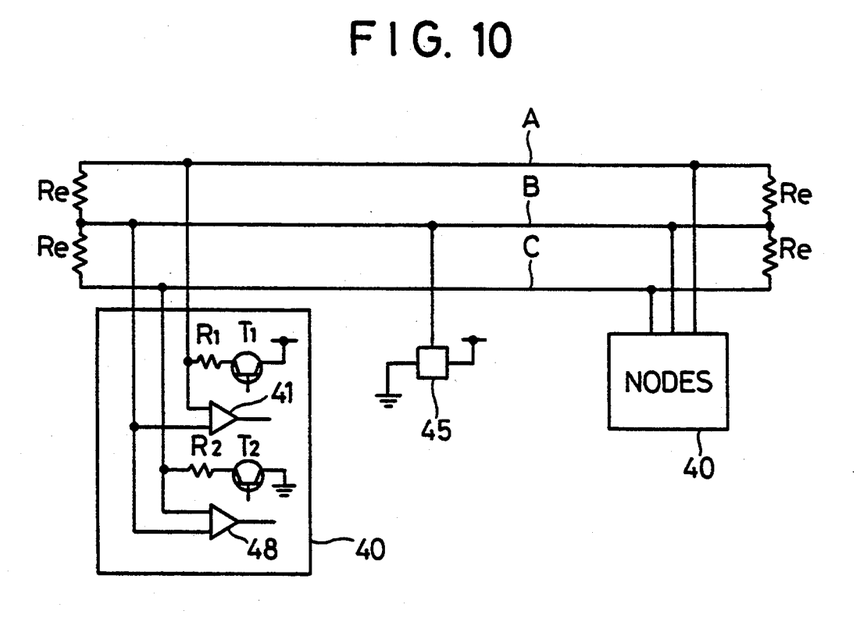
FIG. 10 is a configuration block diagram which shows the third embodiment of the configuration of the multiplex transmission system in accordance with the present invention.

FIG. 9 and FIG. 10 are the configuration block diagrams which illustrate the second and third embodiments of the configuration of the multiplex transmission system in accordance with the present invention.

Referring to FIG. 9, this embodiment shows a case wherein the potentials of the two multiplex transmission lines A and C are driven in the same direction by the driver circuits T1 and T1 for the source current type of the nodes 40, and the multiplex transmission line B is set for GND (0 V) as the return line. In this embodiment, all the nodes 40 use the multiplex transmission lines A and C as the signal lines, and a plurality of transmitted data signals can be detected through a receiving unit 41 from the potential difference arising between the signal lines and the return line B. R1 and R1 are protective resistors for the driver circuits T1 and T1.

In this embodiment, the voltage setting apparatus 42, which supplies potential to the return line B, is provided outside the nodes rather than providing the voltage setting apparatus 42 inside the nodes 40. It is also possible to install this voltage setting apparatus 42 at a particular master node.

The voltage setting apparatus 42 in the second embodiment is connected to the return line B via an earth wire 43. In this voltage setting apparatus 42, the forward voltage of a diode D1 turns a transistor 44 ON, and the forward voltage of a diode D2 provides a potential difference of a protective resistor R3 for preventing overcurrent. Accordingly, in this embodiment, no potential difference exceeding the Forward voltage of the diode D2 is generated in the protective resistor R3, permitting current limitation. Further, this potential difference is equivalent to the forward voltage (approx. 0.6 V) of the diode D2 even at its maximum; therefore, the fluctuation in the potential of the return line B at the time of domination can be minimized.

Likewise, when the return line B is set for Vcc and the driver circuits T1 and T1 are used as a sink current type, the aforementioned multiplex transmission system makes it possible to transmit a plurality of data signals by the potential difference produced between the signal lines A and C and the return line B.

Referring to FIG. 10, the embodiment shows a case wherein the potentials of the two signal lines A and C are driven in different directions by the driver circuit T1 for the source current type and a driver circuit T2 for the sink current type, and a voltage setting apparatus 45 is connected to the return line B, the apparatus being capable of setting the return line B for either GND or Vcc. In this embodiment, transmission is possible even if the signal lines A and C or the return line B is short-circuited with either GND or Vcc. In this embodiment, each of the nodes 40 is capable of detecting a plurality of transmitted data signals by the potential difference produced between the signal lines A and C and the return line B through the receiving units 41 and 48. R1 and R2 are the protective resistors for the driver circuits T1 and T2.

In this embodiment, the signal line A, to which the driver circuit T1 for the source current type is connected, serves as a bus +, while the signal line C, to which the driver circuit T2 for the sink current type is connected, serves as a bus −. In this embodiment, the return line B and the bus + are used for transmission when the potential of the return line B is set for GND, while the return line B and the bus − are used for transmission when the potential of the return line B is set for Vcc.

Figure 11:
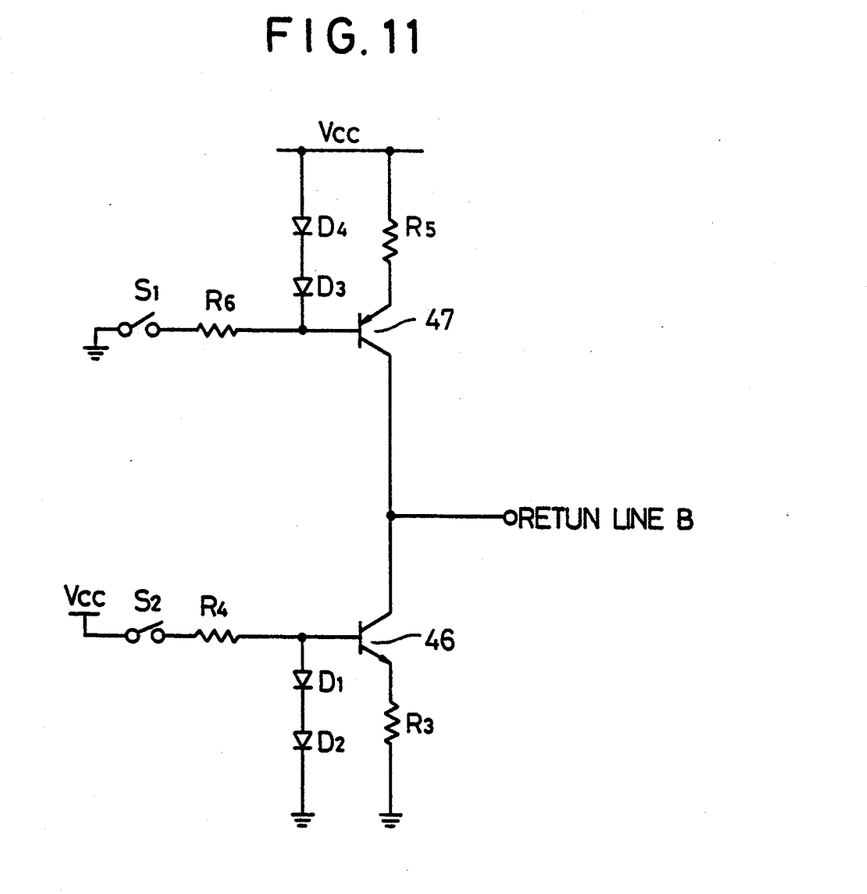
FIG. 11 is a circuit diagram which shows the fourth embodiment of the configuration of the voltage setting apparatus shown in FIG. 10.

FIG. 11 is a circuit diagram which illustrates the fourth embodiment of the configuration of the voltage setting apparatus 45 shown in FIG. 10. In this embodiment, the voltage setting apparatus 45 is provided outside the nodes, but it is also possible to install the voltage setting apparatus 45 at a particular master node.

Referring to FIG. 11, in this embodiment, the forward voltage of diodes D1 and D3 turns transistors 46 and 47 ON, and the forward voltage of diodes D2 and D4 provides the potential difference between the protective resistors R3 and R5 for preventing overcurrent. Accordingly, in this embodiment, when, for example, the potential of the return line B is set for Vcc with the switch S1 ON, no potential difference exceeding the forward voltage of the diode D4 takes place in the protective resistor R5, thus permitting current limitation. Likewise, when the potential of the return line B is set for GND with the switch S2 ON, no potential difference exceeding the forward voltage of the diode D2 takes place in the protective resistor R3, thus permitting current limitation. Further, the potential difference between the protective resistors R3 and R5 is equal to the forward voltage (approx. 0.6 V) of the diodes D2 and D4 even at its maximum, making it possible to minimize the fluctuation in the potential of the return line B at the time of domination.

Thus, in the voltage setting apparatus according to the third and fourth embodiments, current limitation is possible; therefore, even if the return line B is short-circuited, no overcurrent flows into the transmission lines, protecting the lines from damage. Furthermore, since the fluctuation in the potential of the return line at the time of data signal transmission can be minimized, the voltage drop in the resistors in the voltage setting apparatus can be controlled at the time of transmission, the potential in the return line can be maintained at a constant level, and radio noises can be suppressed.

The voltage setting apparatus in accordance with the present invention is not limited to the cases where three or more multiplex transmission lines are used as described above, but it is also applicable to a case where two multiplex transmission lines are used.

Figure 12:
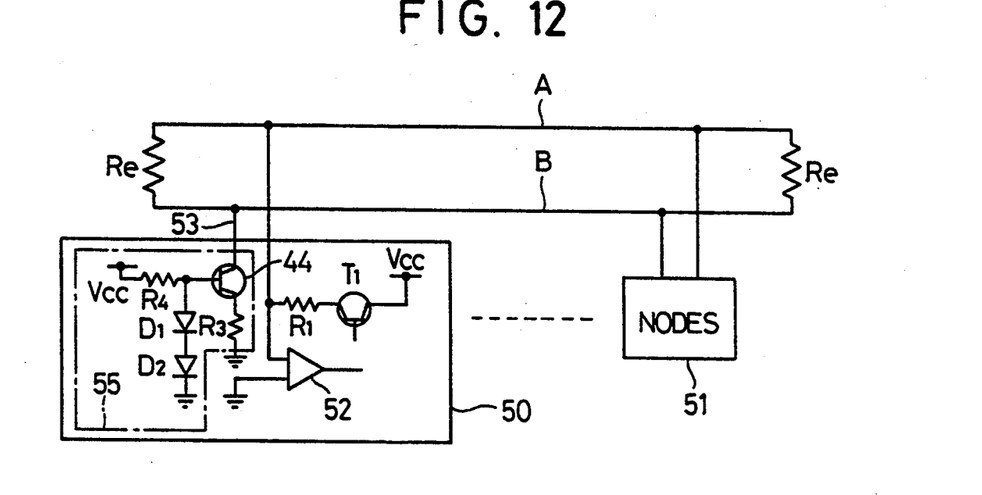
FIG. 12 is a configuration block diagram which shows the fourth embodiment of the configuration of the multiplex transmission system in accordance with the present invention when two multiplex transmission lines are used.
Figure 13:
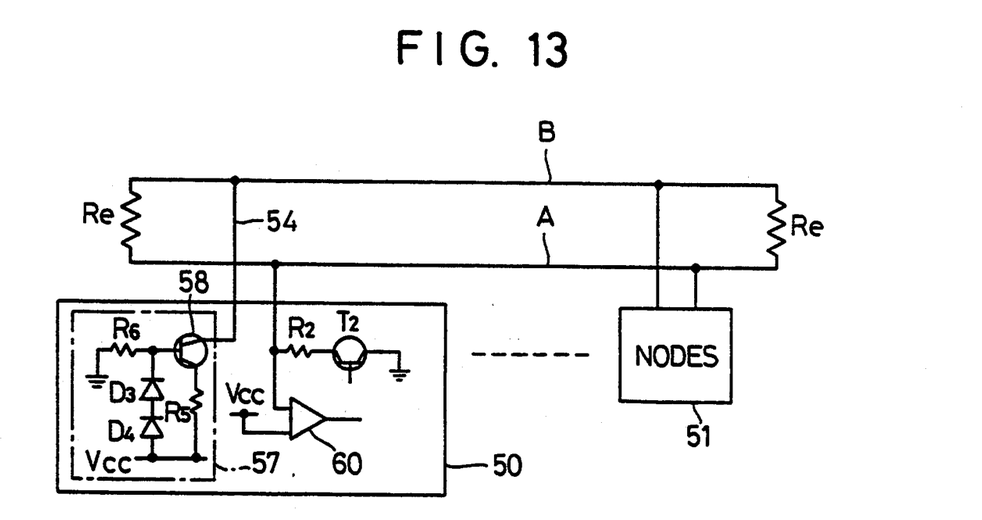
FIG. 13 is a configuration block diagram which shows the fifth embodiment of the configuration of the multiplex transmission system in accordance with the present invention.

FIG. 12 and FIG. 13 are configuration block diagrams which show the fourth and fifth embodiments of the configuration of the multiplex transmission system in accordance with the present invention when two multiplex transmission lines are used.

The fourth embodiment is a case wherein the return line B is connected to the line voltage GND (0 V) via an earth wire 53 and the voltage setting apparatus 55 in a master node 50, which makes one or more voltage settings, among nodes 51. The fifth embodiment is another case wherein the return line B is connected to the line voltage Vcc via a power line 54 and a voltage setting apparatus 57. Receiving units 52 and 60, which are connected to the signal line A, detect the data signals of the signal line A according to a reference voltage at the time of domination.

The voltage setting apparatus 55 shown in FIG. 12 has the same configuration as that of the voltage setting apparatus 42 shown in FIG. 9; therefore, the explanation is omitted.

In a voltage setting apparatus 57 shown in FIG. 13, the forward voltage of the diode D3 turns a transistor 58 ON, and the forward voltage of the diode D4 provides the potential difference of the protective resistor R5 for preventing overcurrent. Accordingly, in this embodiment, no potential difference exceeding the forward voltage of the diode D4 is generated in the protective resistor R5, permitting current limitation. Further, this potential difference is equivalent to the forward voltage (approx. 0.6 V) of the diode D4 even at its maximum; therefore, the fluctuation in the potential of the return line B at the time of domination can be minimized.

Thus, the voltage setting apparatuses shown in FIG. 12 and FIG. 13 are also capable of controlling voltage drops in the resistors in the voltage setting apparatuses at the time of transmission, making it possible to maintain the potential in the return line at a constant level, and permitting suppression of radio noises.

We claim:

1. A voltage setting apparatus in a multiplex transmission system which includes at least two multiplex nodes (11) interconnected via at least three multiplex transmission lines (A, B, C); voltage setting means (16) including a transistor, a resistor and a diode which are connected to a specified one (C) of said multiplex transmission lines and changing the voltage of said specified one of said multiplex transmission lines to a predetermined set value; and a supply system which connects said specified one of said multiplex transmission lines to a power supply and ground to change a potential of each of said multiplex transmission lines, thereby controlling multiplex transmission between multiplex nodes if a multiplex node cannot make communication with another multiplex node, said voltage setting apparatus comprising:

a controller (14) which controls said voltage setting means (16), and executes write control for particular data; and a key port (18) comprising a logic gate, which sets the voltage of said multiplex transmission line (C) by writing said particular data according to said write control, and by sending a state signal corresponding to said particular data to said voltage setting means (16).

2. The voltage setting apparatus in the multiplex transmission system according to claim 1, wherein said voltage setting apparatus is installed in any one of said at least two multiplex nodes.

3. A voltage setting apparatus in a multiplex transmission system which includes at least two multiplex nodes (11) interconnected via at least three multiplex transmission lines (A, B, C); voltage setting means (16) including a transistor, a resistor and a diode which are connected to a specified one (C) of said multiplex transmission lines and changing a voltage of said specified one of said multiplex transmission lines to a predetermined set value; and supply system which connects said specified one of said multiplex transmission lines to a power supply and ground to change a potential of each of said multiplex transmission lines, thereby controlling multiplex transmission between multiplex nodes if a multiplex node cannot make communication with another multiplex node, said voltage setting apparatus comprising:

connecting means (31) which connects said specified one of said multiplex transmission lines (C) with said voltage setting means (16);

a controller (14) which controls said voltage setting means (16), and periodically executes write control for particular data;

a key port (18) comprising a logic gate, which periodically writes said particular data according to said write control, and sends a state signal corresponding to said particular data to said voltage setting means (16); and monitoring means (32) for monitoring a state signal sent periodically, and for disconnecting said specified one of said multiplex transmission lines (C) from said voltage setting means (16) by controlling said connecting means (31) if said state signal is not detected.

4. The voltage setting apparatus in the multiplex transmission system according to claim 3, wherein said monitoring means (32) comprises:

a counter (33) which issues a signal corresponding to a predetermined count value ($Q_n$); and a flip-flop (34) which disconnects said connecting means (31) according to the signal issued by said counter.

5. The voltage setting apparatus in the multiplex transmission system according to claim 3, wherein said monitoring means (32) comprises:

a monostable multivibrator (35) which outputs a predetermined signal (Q) if the state signal is issued within a predetermined time; and a flip-flop (34) which disconnects said connecting means (31) according to the predetermined signal (Q) outputted from said monostable multivibrator (35).

6. The voltage setting apparatus in the multiplex transmission system according to claim 3, wherein said voltage setting apparatus is installed in any one of said at least two multiplex nodes.

* * * * *